(No Model.)

J. C. WALLER.
OVEN THERMOMETER.

No. 268,576. Patented Dec. 5, 1882.

WITNESSES:
C. Neveux
C. Sedgwick

INVENTOR:
J. C. Waller
BY Munn & Co
ATTORNEYS.

UNITED STATES PATENT OFFICE.

JOSEPH C. WALLER, OF PLATTSBURG, NEW YORK.

OVEN-THERMOMETER.

SPECIFICATION forming part of Letters Patent No. 268,576, dated December 5, 1882.

Application filed August 15, 1882. (No model.)

*To all whom it may concern:*

Be it known that I, JOSEPH C. WALLER, of Plattsburg, in the county of Clinton and State of New York, have invented a new and Improved Combined Clock and Thermometer, of which the following is a full, clear, and exact description.

The object of my invention is to provide an improved combined clock and thermometer to be attached to cooking stoves and ranges and bakers' ovens, for the purpose of indicating the heat in the oven and the time the article is exposed to the heat in the said oven.

The invention consists in the combination, with a thermometer-casing, of a clock attached to the upper end of the same, which thermometer-casing and clock are combined with a cooking-stove and arranged in such a manner that the lower end of the thermometer-casing projects into the oven, and the clock is above the top of the stove, whereby the thermometer will indicate the number of degrees of heat in the oven, and the clock will show the length of time the article is exposed to the heat in the oven.

Reference is to be had to the accompanying drawings, forming part of this specification, in which similar letters of reference indicate corresponding parts in all the figures.

Figure 1:
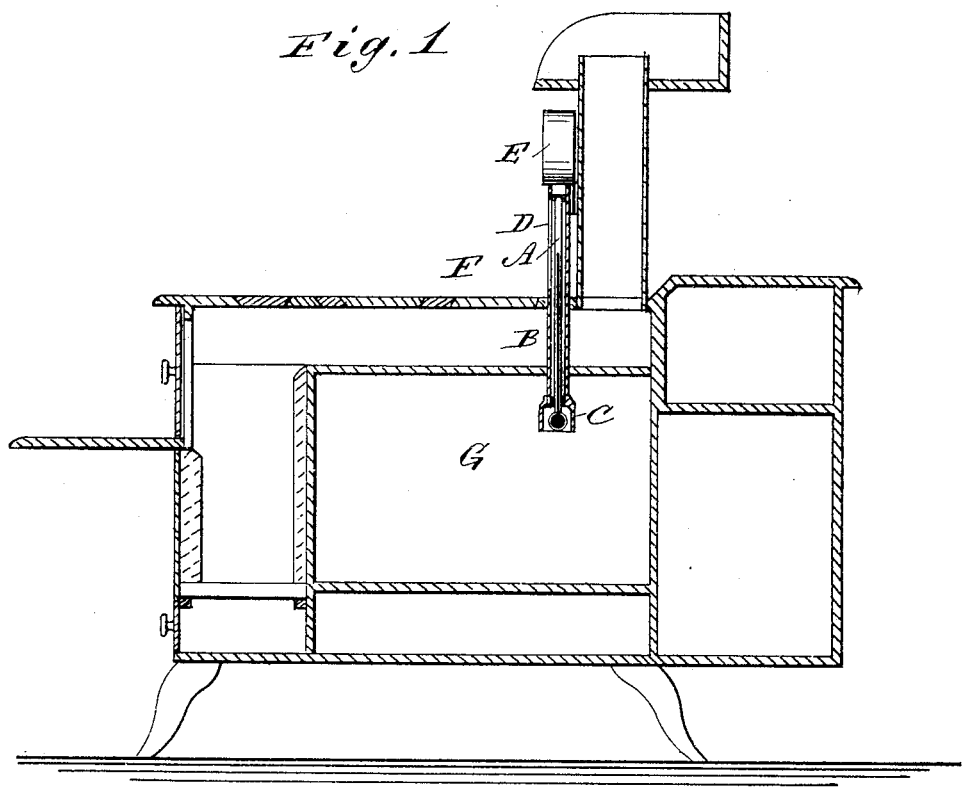
Figure 2:
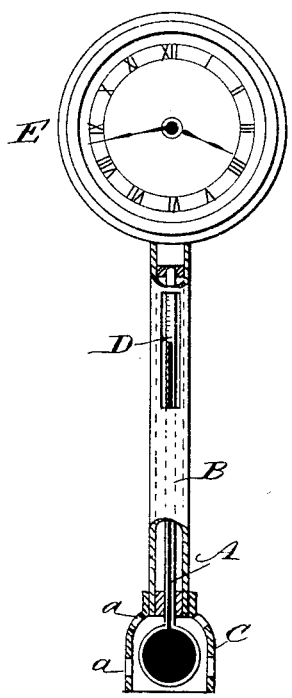

Figure 1 is a longitudinal sectional elevation of a cooking stove or range provided with my improved combined clock and thermometer. Fig. 2 is a longitudinal front elevation of my improved combined clock and theremometer, parts being broken out and shown in section.

A thermometer, A, is contained in a metal casing, B, provided with an inverted cup, C, at the bottom, which surrounds the bulb of the thermometer. Near its upper end the casing B is provided with a longitudinal slot, D, through which the graduations of the thermometer-tube can be seen. A clock, E, is fastened on the upper end of the casing B, which casing B is secured on a cooking stove or range, F, in such a manner that the lower end of said casing will be within the baking-oven G. The thermometer indicates the number of degrees of heat in the baking-oven, and the clock can be used to ascertain the number of minutes that the article to be baked is exposed to the heat in the said oven.

I have published a "Scientific Cooking Instructor and Key" to be used in connection with the above-described improved combined clock and thermometer. In the said "Key" I have given the required temperature for cooking or baking the articles, and have also given the number of minutes or the time that the said articles must be exposed to the heat. The articles can thus be cooked or baked without once opening the oven-door to ascertain the condition of the article. All that is necessary is to prevent any great changes of temperature and to remove the articles from the oven after the specified time, which time and temperature naturally vary according to the nature of the article to be cooked or baked.

Having thus fully described my invention, I claim as new and desire to secure by Letters Patent—

The case B, supporting a clock and containing a thermometer-tube, and having a cup, C, at its lower end and a longitudinal slot, D, near its upper end, said tube extending from the oven of a stove upward through the flue or case in such a way that the temperature of the oven may be indicated above the stove, while the tube is protected from the heat of the flue, substantially as set forth.

JOSEPH C. WALLER.

Witnesses:
 A. M. WARREN,
 J. P. BRENAN.